US00RE40781E

(19) United States
(12) Reissued Patent
Johannsen et al.

(10) Patent Number: US RE40,781 E
(45) Date of Reissued Patent: Jun. 23, 2009

(54) METHOD OF PROVIDING A HYDROPHOBIC LAYER AND CONDENSER MICROPHONE HAVING SUCH A LAYER

(75) Inventors: Ib Johannsen, Vaerlose (DK); Niels Bent Larsen, Rødovre (DK); Matthias Mullenborn, Lyngby (DK); Pirmin Hermann Otto Rombach, Ho Chi Minh (VN)

(73) Assignee: Pulse MEMS ApS, Roskilde (DK)

(21) Appl. No.: 11/502,577

(22) Filed: Aug. 10, 2006

Related U.S. Patent Documents

Reissue of:
(64) Patent No.: 6,859,542
Issued: Feb. 22, 2005
Appl. No.: 09/867,606
Filed: May 31, 2001

(51) Int. Cl.
*H04R 25/00* (2006.01)

(52) U.S. Cl. ..... 381/174; 381/175; 381/191
(58) Field of Classification Search ..... 381/113, 381/116, 174, 175, 191, 369; 361/283.1; 367/181, 170
See application file for complete search history.

(56) References Cited

U.S. PATENT DOCUMENTS

| | | | |
|---|---|---|---|
| 3,963,881 | A | 6/1976 | Fraim et al. |
| 4,508,613 | A | 4/1985 | Busta et al. |
| 4,746,898 | A | 5/1988 | Loeppert |
| 4,760,250 | A | 7/1988 | Loeppert |
| 4,910,840 | A | 3/1990 | Sprenkels et al. |
| 5,178,015 | A | 1/1993 | Loeppert et al. |
| 5,208,789 | A | 5/1993 | Ling |
| 5,367,429 | A | 11/1994 | Tsuchitani et al. |
| 5,446,413 | A | 8/1995 | Loeppert et al. |
| 5,490,220 | A | 2/1996 | Loeppert |
| 5,658,698 | A | 8/1997 | Yagi et al. |
| 5,708,123 | A | 1/1998 | Johannsen et al. |

(Continued)

FOREIGN PATENT DOCUMENTS

CA 2 383 740 3/2001

(Continued)

OTHER PUBLICATIONS

Ning et al., "Fabrication of a silicon miceomachined capacitive microphone using a dry–etch process" Sensors and Actuators A 53 (1996) 237–242.

(Continued)

*Primary Examiner*—Brian Ensey
(74) *Attorney, Agent, or Firm*—Nixon Peabody LLP

(57) ABSTRACT

A method of providing at least part of a diaphragm and at least a part of a back-plate of a condenser microphone with a hydrophobic layer so as to avoid stiction between said diaphragm and said back-plate. The layer is deposited via a number small of openings in the back-plate, the diaphragm and/or between the diaphragm and the back-plate. Provides a homogeneous and structured hydrophobic layer, even to small internal cavities of the microstructure. The layer may be deposited by a liquid phase or a vapor phase deposition method. The method may be applied naturally in continuation of the normal manufacturing process.

Further, a MEMS condenser microphone is provided having such a hydrophobic layer. The static distance between the diaphragm and the back-plate of the microphone is smaller than 10 μm.

73 Claims, 3 Drawing Sheets

U.S. PATENT DOCUMENTS

| | | | | |
|---|---|---|---|---|
| 5,740,261 | A | 4/1998 | Loeppert et al. | |
| 5,812,496 | A | 9/1998 | Peck | |
| 5,822,170 | A | 10/1998 | Cabuz et al. | |
| 5,861,779 | A | 1/1999 | Loeppert et al. | |
| 5,870,482 | A | 2/1999 | Loeppert et al. | |
| 5,889,872 | A | 3/1999 | Sooriakumar et al. | |
| 6,012,021 | A | 1/2000 | Rombach et al. | |
| 6,012,335 | A | 1/2000 | Bashir et al. | |
| 6,088,463 | A | 7/2000 | Rombach et al. | |
| 6,134,333 | A | 10/2000 | Flagler | |
| 6,225,140 | B1 | 5/2001 | Liu et al. | |
| 6,293,148 | B1 | 9/2001 | Wang et al. | |
| 6,410,107 | B1 | 6/2002 | Sato et al. | |
| 6,512,833 | B2 | 1/2003 | Himori et al. | |
| 6,522,762 | B1 | 2/2003 | Mullenborn et al. | |
| 6,535,460 | B2 | 3/2003 | Loeppert et al. | |
| 6,552,469 | B1 | 4/2003 | Pederson et al. | |
| 6,578,427 | B1 | 6/2003 | Hegner | |
| 6,622,368 | B1 | 9/2003 | Mullenborn et al. | |
| 6,732,588 | B1 | 5/2004 | Mullenborn et al. | |
| 6,788,795 | B2 | 9/2004 | Scheeper et al. | |
| 6,812,620 | B2 | 11/2004 | Scheeper et al. | |
| 6,829,131 | B1 | 12/2004 | Loeb et al. | |
| 6,847,090 | B2 | 1/2005 | Loeppert | |
| 2001/0000329 | A1 | 4/2001 | Sato et al. | 427/58 |
| 2002/0031234 | A1 | 3/2002 | Wenger et al. | |
| 2002/0064292 | A1 | 5/2002 | Rombach et al. | |
| 2003/0021432 | A1 | 1/2003 | Scheeper et al. | |
| 2003/0034536 | A1 | 2/2003 | Scheeper et al. | |
| 2003/0128854 | A1 | 7/2003 | Mullenborn et al. | |

FOREIGN PATENT DOCUMENTS

| | | |
|---|---|---|
| CA | 2 383 901 | 3/2001 |
| EP | 0 561 566 | 3/1993 |
| EP | 0849082 A2 | 6/1998 |
| EP | 0899093 | 3/1999 |
| EP | 1 052 880 | 8/1999 |
| EP | 1 469 701 | 8/2001 |
| WO | WO 89/03125 | 4/1989 |
| WO | WO 93/04495 | 3/1993 |
| WO | WO 98/18855 | 5/1998 |
| WO | WO 00/46278 | 8/2000 |
| WO | WO 00/62580 | 10/2000 |
| WO | WO 00/67526 | 11/2000 |
| WO | WO 01/14248 | 3/2001 |
| WO | WO 01/26136 | 4/2001 |
| WO | WO 02/015636 | 2/2002 |
| WO | WO 02/052893 | 7/2002 |
| WO | WO 02/052894 | 7/2002 |

OTHER PUBLICATIONS

An Integrated Graphics to Pattern Generator System, G.W. Neudeck and P.V. Loeppert, IEEE, 1981, pp. 32–36.

Fabrication of a Subminiature Silicone Condenser Microphone Using The Sacrificial Layer Technique, P. R. Scheeper, W. Olthuis and P. Bergveld, IEEE, 1991, pp. 408–411.

Investigation of Attractive Forces Between PECVD Silicon Nitride Microstructures and an Oxidized Silicon Substrate, P. R. Scheeper, J.A. Voorthuyzen, W. Olthuis and P. Bergveld, Sensors and Actuators A, 30, 1992, pp. 231–239.

Amplitude–Modulated Electro–Mechanical Feedback System for Silicon Condenser Microphones, A.G.H. van der Donk, P.R. Scheeper, W. Olthuis and P. Bergveld, J. Micromech. Microeng., 2 1992, pp. 211–214.

The Effect of Release–Etch Processing on Surface Microstructure Stiction, R.L. Alley G.J.Cuan, R.T. Howe and K. Komvopoulos, IEEE, 1992, pp. 202–207.

Fabrication of Silicon Condenser Microphones Using Single Wafer Technology, P.R. Scheeper, A.G.H. van der Donk, W. Olthuis and P. Bergveld, Journal of Microelectromechanical Systems, vol. 1, No. 3, Sep. 1992, pp. 147–154.

A Silicon Condenser Microphone with a Silicon Nitride Diaphragm and Backplate, P.R. Scheeper, W. Olthuis and P. Bergveld, J. Micromech. Microeng., 2, 1992, pp. 187–189.

A Dry–Release Method Based on Polymer Columns for Microstructure Fabrication, C.H. Mastrangelo and G.S. Saloka, IEEE, 1993, pp. 77–81.

Improvement of the Performance of Microphones with a Silicon Nitride Diaphragm and Backplate, P.R. Scheeper, W. Olthuis and P. Bergveld, Sensors and Actuators A, 40, 1994, pp. 179–186.

Modelling of Silicon Condenser Microphones, A.G.H. van der Donk, P.R. Scheeper, W. Olthuis and P. Bergveld, Sensors and Actuators A, 40, 1994, pp. 203–216.

Applications of Fluorocarbon Polymers in Micromechanics and Micromachining, H.V. Jansen, J.G.E. Gardeniers, J. Elders, H.A.C. Tilmans and M. Elwenspoek, Sensors and Actuators A, 41–42, 1994, pp. 136–140.

The Design, Fabrication, and Testing of Corrugated Silicon Nitride Diaphragms, Patrick R. Scheeper, Wouter Olthuis and Piet Bergveld, Journal of Microelectromechanical Systems, vol. 3, No. 1, Mar. 1994, pp. 36–42.

A Review of Silicon Microphones, P.R. Scheeper, A.G.H. van der Donk, W. Olthuis and P. Bergveld, Sensors and Actuators A, 44, 1994, pp. 1–11.

Phase Transitions in Diglyceride Monolayers Studied by Computer Simulations, Pressure–Area Isotherms and X–Ray Diffraction, G.H. Peters, S. Toxvaerd, N.B. Larsen, T. Bjørnholm, K. Schaumburg and K. Kjaer, Il Nuovo Cimento, vol. 16D, No. 9, 1994, pp. 1479–1485.

Structural Studies of Langmuir and Langmuir–Blodgett Films of Functionalized Surfactants, N.B. Larsen, T. Bjørnholm, J. Garnaes, J. Als–Nielsen and K. Kjaer, Synthetic Metals, vol. 71, 1995, pp. 1985–1988.

Structure and Dynamics of Lipid Monolayers: Implications for Enzyme Catalysed Lipolysis, Günther H. Peters, S. Toxvaerd, N.B. Larsen, T. Bjørnholm, K. Schaumburg and K. Kjaer, Structural Biology, vol. 2, No. 5, May 1995, pp. 395–401.

On the Electromechanical Behaviour of Thin Perforated Backplates in Silicon Condenser Microphones, M. Pedersen, W. Olthuis and P. Bergveld, 8th International Conference on Solid–State Sensors and Actuators, and Eurosensors IX, Stockholm, Sweden, 234–A7, Jun. 25–29, 1995, pp. 13–16.

Electroacoustical Measurements of Silicon Microphones on Wafer Scale, Michael Pedersen, Ralf Schellin, Wouter Olthuis and Piet Bergveld, J. Acoust. Soc. Am., vol. 101, No. 4, Apr. 1997, pp. 2122–2128.

A Piezoelectric Triaxial Accelerometer, Patrick Scheeper, Jens Ole Gulløv and Lars Munch Kofoed, J. Micromech. Microeng., 6, 1996, pp. 131–133.

On the Mechanical Behaviour of Thin Perforated Plates and Their Application in Silicon Condenser Microphones, M. Pedersen, W. Olthuis and P. Bergveld, Sensors and Actuators A, 54, 1996, pp. 499–504.

Stiction in Surface Micromachining, Niels Tas, Tonny Sonnenberg, Henri Jansen, Rob Legtenberg and Miko Elwenspoek, J. Micromech. Microeng., 6, 1996, pp. 385–397.

Self–Assembled Monolayer Films as Durable Anti–Stiction Coatings for Polysilicon Microstructures, Michael R. Houston, Roya Maboudian and Roger T. Howe, Solid–State Sensor and Actuator Workshop, Hilton Head, South Carolina, Jun. 2–6, 1996, pp. 42–47.

A Silicon Condenser Microphone with Polyimide Diaphragm and Backplate, Michael Pedersen, Wouter Olthuis and Piet Bergveld, Sensors and Actuators A, 63, 1997, pp. 97–104.

Harmonic Distortion in Silicon Condenser Microphones, Michael Pedersen, Wouter Olthuis and Piet Bergveld, J. Acoust. Soc. Am., vol. 102, No. 3, Sep. 1997, pp. 1582–1587.

Improved Autoadhesion Measurement Method for Micromachined Polysilicon Beams, Maarten P. de Boer and Terry A. Michalske, Materials Research Society Symp. Proc., vol. 444, 1997, pp. 87–92.

Development and Fabrication of Capacitive Sensors in Polyimide, Michael Pedersen, Wouter Olthuis and Piet Bergveld, Sensors and Materials, vol. 10, No. 1, 1998, pp. 1–20.

Micromachined Microphones Have Amplified Opportunities, Sensor Business Digest, vol. 6, No. 7, Apr. 1, 1997.

Silicon Microphone for Hearing Aid Applications, Jesper Bay, Ph.D Thesis, ATV Industrial Research Education Project, Erhvervsforskerprojekt EF 498, Jun. 1997, 136 p.

Development of a Modal Analysis Accelerometer Based on a Tunneling Displacement Transducer, Patrick R. Scheeper, J. Kurth Reynolds and Thomas W. Kenny, IEEE, Transducers '97, International Conference on Solid–State Sensors and Actuators, Chicago, Jun. 16–19, 1997, pp. 867–870.

Fluorocarbon Film for Protection from Alkaline Etchant and Elimination of In–Use Stiction, Yoshinori Matsumoto, Kazumasa Yoshida and Makoto Ishida, Transducers '97, International Conference on Solid–State Sensors and Actuators, Chicago, Jun. 16–19, 1997, pp. 695–698.

Self–Assembled Fluorocarbon Films for Enhanced Stiction Reduction, Uthara Srinivasan, Michael R. Houston, Roger T. Howe and Roya Maboudian, Transducers '97, International Conference on Solid–State Sensors and Actuators, Chicago, June 16–19, 1997, pp. 1399–1402.

An Integrated Silicon Capacitive Microphone with Frequency–Modulated Digital Output, Michael Pedersen, Wouter Olthuis and Piet Bergveld, Sensors and Actuators A, 69, 1998, pp. 267–275.

Silicon Microphones—A Danish Perspective, Siebe Bouwstra, Torben Storgaard–Larsen, Patrick Scheeper, Jens Ole Gullov, Jesper Bay, Matthias Müllenborn and Pirmin Rombach, J. Micromech. Microeng., 8, 1998, pp. 64–68.

Alkyltrichlorosilane–Based Self–Assembled Monolayer Films for Stiction Reduction in Silicon Micromachines, Uthara Srinivasan, Michael R. Houston, Roger T. Howe and Roya Maboudian, Journal of Microelectromechanical Systems, vol. 7, No. 2, Jun. 1998, pp. 252–260.

X–ray Diffraction and Molecular–Dynamics Studies: Structural Analysis of Phases in Diglyceride Monolayers, G.H. Peters, N.B. Larsen, T. Bjørnholm, S. Toxvaerd, K. Schaumburg and K. Kjaer, American Physical Society, Physical Review E, vol. 57, No. 3, Mar. 1998, pp. 3153–3163.

Transport Mechanisms of Alkanethiols During Microcontact Printing on Gold, E. Delamarche, H. Schmid, A. Bietsch, N.B. Larsen, H. Rothuizen, B. Michel and H. Biebuyck, J. Phys. Chem. B, vol. 102, No. 18, 1998, pp. 3324–3334.

Lubrication of Polysilicon Micromechanisms with Self–Assembled Monolayers, Uthara Srinivasan, Jonathan D. Foster, Usman Habib, Roger T. Howe, Roya Maboudian, Donna Cowell Senft and Michael T. Dugger, Solid–State Sensor and Actuator Workshop, Milton Head Island, South Carolina, Jun. 8–11, 1998, pp. 156–161.

Self–Assembly of Regioregular, Amphiphilic Polythiophenes into Highly Ordered π–Stacked Conjugated Polymer Thin Films and Nanocircuits, Thomas Bjørnholm, Daniel R. Greve, Niels Reitzel, Tue Hassenkam, Kristian Kjaer, Paul B. Howes, Niels B. Larsen, Jesper Bøgelund, Manikandan Jayaraman, Paul C. Ewbank and Richard D. McCullough, J. Am. Chem. Soc., vol. 120, No. 30, 1998, pp. 7643–7644.

Surface Texturing and Chemical Treatment Methods for Reducing High Adhesion Forces at Micromachine Interfaces, K. Komvopoulos, Part of the SPIE Conference on Materials and Device Characterization in Micromachining, Santa Clara, California, SPIE vol. 3512, Sep. 1998, pp. 106–122.

High–Performance Condenser Microphone with Fully Integrated CMOS Amplifier and DC–DC Voltage Converter, Michael Pedersen, Wouter Olthuis and Piet Bergveld, Journal of Microelectromechanical Systems, vol. 7, No. 4, Dec. 1998, pp. 387–394.

The Lamellar Period in Symmetric Diblock Copolymer Thin Films Studied by Neutron Reflectivity and AFM, Nikolaj Gadegaard Kristoffer Almdal, Niels Bent Larsen and Kell Mortensen, Applied Surface Science, vol. 142, 1999, pp. 608–613.

A New Class of Surface Modifiers for Stiction Reduction, Bong–Hwan Kim, Chang–Hoon Oh, Kukjin Chun, Taek–Dong Chung, Jang–Woong Byun and Yoon–Sik Lee, IEEE, 1999, pp. 189–193.

Lubricating Effect of Thin Films of Styrene–Dimethylsiloxane Block Copolymers, Sokol Ndoni, Patric Jannasch, Niels Bent Larsen and Kristoffer Almdal, Langmuir: The ACS Journal of Surfaces and Colloids, vol. 15, No. 11, 1999, pp. 3859–3865.

Ablation from Artificial or Laser–Induced Crater Surfaces of Silver by Laser Irradiation at 355nm, B. Toftmann, J. Schou and N.B. Larsen, Appl. Phys. A, 69 [Suppl.], 1999, pp. S811–S814.

The Incredible Shrinking Microphone, Jennifer Ouellette, The Industrial Physicist, Aug. 1999, pp. 7–9.

Pulsed Laser Deposited Coating for Stiction and Wear Reduction in MEMS Device, J.S. Pelt, M.E. Ramsey, R. Magaña Jr., E. Poindexter Jr., M.P. de Boer, D.A. LaVan, M.T. Dugger, J.H. Smith and S.M. Durbin, Part of the SPIE Conference on Micromachining and Microfabrication Process Technology V, Santa Clara, California, SPIE vol. 3874, Sep. 1999, pp. 76–84.

Self–Assembled Monolayers As Anti–Stiction Coatings For MEMS: Characteristics and Recent Developments, Roya Maboudian, W. Robert Ashurst and Carlo Carraro, Sensors and Actuators, vol. 82, 2000, pp. 219–223.

Chemical Vapor Deposition Coating for Micromachines, S.S. Mani, J.G. Fleming, J.J. Sniegowski, M.P. de Boer, L.W. Irwin, J.A. Walraven, D.M. Tanner and M.T. Dugger, Material Research Society Symp. Proc., vol. 616, 2000, pp. 21–26.

Selective W for Coating and Releasing MEMS Devices, S.S. Mani, J.G. Fleming, J.J. Sniegowski, M.P. de Boer, L.W. Irwin, J.A. Walraven, D.M. Tanner, D.A. LaVan, Material Research Society Symp. Proc., vol. 605, 2000, pp. 135–140.

Characterization of Ultrathin Poly(ethylene glycol) Monolayers on Silicon Substrates, Alexander Papra, Nikolaj Gadegaard and Niels B. Larsen, Langmuir: The ACS Journal of Surfaces and Colloids, vol. 17, No. 5, 2001, pp. 1457–1460.

The Influence of Coating Structure on Micromachine Stiction, J.G. Kushmerick, M.G. Hankins, M.P. de Boer, P.J. Clews, R.W. Carpick and B.C. Bunker, Tribology Letters, vol. 10, No. 1–2, 2001, pp. 103–108.

Wettability Modification of Polysilicon for Stiction Reduction in Silicon Based Micro–Electromechanical Structures, Angeles Marcia Almanza–Workman, Srini Raghaven, Pierre Deymier, David J. Monk and Ray Roop, Solid State Phenomena, vol. 76–77, 2001, pp. 23–26.

New Applications and Services in Smart Buildings Using Multifunctional Transponders, Gerd von Bögel and Klaus Scherer, MST News, Feb. 2001, pp. 34–35.

Dichlorodimethylsilane as an Anti–Stiction Monolayer for MEMS: A Comparison to the Octadecyltrichlosilane Self–Assembled Monolayer, W. Robert Ashurst, Christina Yau, Carlo Carraro, Roya Maboudian and Michael T. Dugger, Journal of Microelectromechanical Systems, vol. 10, No. 1, Mar. 2001, pp. 41–49.

Surface Modification of Polystyrene by Blending Substituted Styrene Copolymers, Xianyi Chen, Katja Jankova, Joergen Kops, Niels B. Larsen, Walther Batsberg and Ib Johannsen, Journal of Polymer Science: Part B, vol. 39, 2001, pp. 1046–1054.

Microfluidic Networks Made of Poly(dimethylsiloxane), Si, and Au Coated with Polyethylene Glycol for Patterning Proteins onto Surfaces, Alexander Papra, Andre Bernard, David Juncker, Niels B. Larsen, Bruno Michel and Emmanuel Delmarche, Langmuir: The ACS Journal of Surfaces and Colloids, vol. 17, 2001, pp. 4090–4095.

Surface Morphology of PS–PDMS Diblock Copolymer Films, T.H. Andersen, S. Tougaard, N.B. Larsen, K. Almdal and I. Johannsen, Journal of Electron Spectroscopy and Related Phenomena, vol. 121, 2001, pp. 93–110.

Polymer Durability, Afshin Ghanbari–Siahkali, Peter Kingshott, Niels Bent Larsen, Lutfi Fakhri Al–Saidi, Kristoffer Almdal, and Ib Johannsen, MONOPOL Centerkontrakten at Danish Polymercenter, May 22, 2001.

Anti–Stiction Coatings For Surface Micromachines, Roya Maboudian, SPIE Conference on Micromachining and Microfabrication Process Technology IV, Santa Clara, California, Sep. 1998, pp. 108–113.

Fabrication and Characterization of a Piezoelectric Accelerometer, Roger de Rues, Jens Ole Gullov and Patrick R. Scheeper, J. Micromech. Microeng., vol. 9, 1999, pp. 123–126.

Optimization of Capative Microphone and Pressure Sensor Perfomance by Capacitor–Electrode Shaping, J.A. Voorthuyzen, A.J. Spenkels, A.G.H. van deer Donk, P.R. Scheeper and P. Bergveld, Sensors and Actuators A, 25–27, 1991, pp. 331–336.

PECVD Silicon Nitride Diaphragms for Condenser Microphones, P.R. Scheeper, J.A. Voorthuyzen and P. Bergveld, Sensors and Actuators B, 4, 1991, pp. 79–84.

Deposition and Characterization of ITO Films Produced by Laser Ablation at 355 nm, E. Holmelund, B. Thestrup, N.B. Larsen, M.M. Nielsen, E. Johnson and S. Tougaard, Applied Physics A, 74, 2002, pp. 147–152, paper received on Jan. 16, 2001 and published online on Oct. 17, 2001.

Directed Self–Assembly of Amphiphilic Regioregular Polythiophenes on the Nanometer Scale, D.R. Greve, Niels Reitzel, Tue Hassenkam, Jesper Bøgelund, Kristian Kjaer, Paul B. Howes, Niels B. Larsen, Manikandan Jayaraman, Manikandan Jayaraman, R.D. McCullough and T. Bjørnholm, Synthetic Metals, 102, 1999, pp. 1502–1505.

Langmuir–Blodgett Films of a Functionalized Molecule with Cross–Sectional Mismatch Between Head and Tail, J. Garnaes, N.B. Larsen, T. Bjørnholm, M. Jørgensen, K. Kjaer, J. Als–Nielsen, J. Jørgensen and J.A. Zasadzinski, Science, vol. 264, May 27, 1994, pp. 1301–1304.

Ordering of the Disk–Like 2,3,6,7,10,11–Hexakis(hexylthio)triphenylene in Solution and at a Liquid–Solid Interface, J.C. Gabriel, N.B. Larsen, M. Larsen, N. Harrit, J.S. Pedersen, K. Schaumburg and K. Bechgaard, Langmuir: The ACS Journal of Surfaces and Colloids, vol. 12, 1996, pp. 1690–1692.

Micromachined Transducers Sourcebook, Gregory T.A. Kovacs, WCB McGaw–Hill, 1998, 911 p.

A Silicon Condenser Microphone: Materials and Technology, P. Scheeper, 1993, 204 p. 25–page fax from Anthony G. Sitko of Marshall, Gerstein & Borun to Jorn Bjerragaar–Nielsen of Sonion A/S, dated Jul. 28, 2005, transmitting an analysis of Patrick Scheeper, A Silicon Condenser Microphone: Materials and Technology, 1993 and Gregory T.A. Kovacs, Micromachined Transducer Sourcebook, 1998 and further transmitting a draft Request For *Exparte* Reexamination.

PCT International Preliminary Examination Report, European Patent Office, completed Jun. 13, 2003, for International application No. PCT/DK02/00365 which claims priority to U.S. Appl. No. 09/867,606 (now U.S. Patent No. 6,859,542).

Suppression of Stiction in MEMS, C.H. Mastrangelo, 1999 Spring MRS Meeting, Boston, MA, Dec. 1999, pp. 1–12.

Advanced Microphone Technology, Peter V. Leoppert and Timothy K. Wickstrom, Emkay Innovative Products, Rolling Meadows, Illinois, Presented at AVIOS, 1999.

Morphology Evolution of Polycarbonate–Polystrene Blends During Compounding, Chengzhi Chuai, Kristoffer Almdal, Ib Johannsen and Jørgen Lyngaae–Jørgensen, The Danish Polymer Center at The Technical University of Denmark, Roskilde, Denmark, 2001.

Critical Review: Adhesion in Surface Micromechnical Structures, Roya Maboudian and Roger T. Howe, J. Vac. Sci. Technol. B, vol. 15(1), Jan./Feb. 1997, pp. 1–20.

Silanization of Solid Substrates: A Step Toward Reproducibility, J.B. Brzoska, I. Ben Azouz and F. Rondelez, *Langmuir,* vol. 10, 1994, pp. 4367–4373.

Thoughts on the Structure of Alkylsilane Monolayers, Mark J. Stevens, *Langmuir,* vol. 15, 1999, pp. 2773–2778.

Mechanistic Aspects of Alkylchlororsilane Coupling Reactions, R.R. Rye, G.C. Nelson and M.T. Dugger, *Langmuir,* vol. 13, 1997, pp. 2965–2972.

A Low–Voltage Silicon Condenser Microphone for Hearing Instrument Applications, Pirmin Rombach, Matthias Müllenborn, Udo Klein, Lis Nielsen and Roger Frehoff, Joint Meeting of ASA/EAA/DEGA, Session 2aEA, Engineering Acoustics: Silicon Sensors, J. Acoust. Soc. Am., vol. 105, No. 2, Pt. 2 Feb. 1999, p. 997.

A Silicon Condenser Microphone With a Highly Perforated Backplate, J. Bergqvist, F. Rudolf, J. Maisano, F. Parodi and M. Rossi, IEEE, 1991, pp. 266–269.

Lubrication of Digital Micromirror Devices™, Steven A. Henck, Tribology Letters, vol. 3, 1997, pp. 239–247.

Vapor Phase Self–Assembly of Fluorinated Monolayers on Silicon and Germanium Oxide, Patrick W. Hoffmann, Martin Stelzle and John F. Rabolt, *Langmuir,* vol. 13, 1997, pp. 1877–1880.

A High Performance MEMS Thin–Film Teflon Electret Microphone, Wen H. Hsieh, Tze–Jung Yao and Yu–Chong Tai, Transducers '99, Sendai, Japan, Jun. 7–10, 1999, pp. 1064–1067.

Surface Micromachined Driven Shielded Condenser Microphone With a Sacrificial Layer Etched From the Backside, M. Ikeda, N. Shimizu and M. Esashi, Transducers '99, Sendai, Japan, Jun. 7–10, 1999, pp. 1070–1073.

High Sensitivity Acoustic Transducers With Thin p + Membranes and Gold Back–Plate, A.E. Kabir, R. Bashir, J. Bernstein, J. De Santis, R. Mathews, J.O. O'Boyle and C. Bracken, Sensors and Actuators, vol. 78, 1999, pp. 138–142.

Improved IC–Compatible Piezoelectric Microphone and CMOS Process, E.S. Kim, J.R. Kim and R.S. Muller, IEEE, 1991, pp. 270–273.

Elimination of Post–Release Adhesion in Microstructures Using Conformal Fluorocarbon Coatings, Piu Francis Man, Bishnu P. Gogoi and Carlos H. Mastrangelo, Journal of Microelectromechanical Systems, vol. 6, No. 1, Mar. 1997, pp. 25–34.

Anti–Stiction Silanization Coating to Silicon Micro–Structures by a Vapor Phase Deposition Process, Jiro Sakata, Toshiyuki Tsuchiya, Atsuko Inoue, Sanae Tokumitsu and Hirofumi Funabashi, Technical Digest—Transducers '99, Sendai, Japan, Jun. 7–10, 1999.

Crosstalk Study of an Integrated Ultrasound Transducer Array With a Micromachined Diaphragm Structure, Jian–Hua Mo, J. Brian Fowlkes, Andrew L. Robinson and Paul L. Carson, Transducers '91, 1991 International Conference on Solid–State Sensors and Actuators, 1991, pp. 258–265.

A Micromachined Thin–Film Teflon Electret Microphone, Wen H. Hsieh, Tseng–Yang Hsu and Yu–Chong Tai, Transducers '97, 1997 International Conference on Solid–State Sensors and Actuators, Chicago, Jun. 16–19, 1997, pp. 425–428.

A Polymer Condenser Microphone on Silicon with On–Chip CMOS Amplifier, Michael Pedersen, Wouter Olthuis and Piet Bergveld, Transducers '97, 1997 International Conference on Solid–State Sensors and Actuators, Chicago, Jun. 16–19, 1997, pp. 445–446.

Future of MEMS: An Industry Point of View, Benedetto Vigna, 7th International Conference on Thermal, Mechanical and Multiphysics Simulation and Experiments in Micro–Electronics and Micro–Systems, EuroSim E 2006, IEEE, 2006 (first page only).

All–Surface–Micromachined Si Microphone, Flavio Pardo, R. Boie, G. Elko, R. Sarpeshkar and D.J. Bishop, Transducers '99, Sendai, Japan, Jun. 7–10, 1999, pp. 1068–1069.

Measuring and Modeling Electrostatic Adhesion in Micromachines, M.P. de Boer, M.R. Tabbara, M.T. Dugger, P.J. Clews and T.A. Michalskim, Transducers '97, International Conference on Solid State Sensors and Actuators, Chicago, Jun. 16–19, 1997, vol. 1, pp. 229–232.

Alkene Based Monolayer Films as Anti–Stiction Coatings for Polysilicone MEMS, W. Robert Ashurst, Christina Yau, Carlo Carraro, Roger T. Howe and Roya Maboudian, Sensors and Actuators A: Physical, vol. 91, No. 3, 2001.

Anti–Stiction Methods for Micromechanical Devices: A Statistical Comparison of Performance, Svetlana Tatic–Lucic, Paul Jaramillo, James Bustillo, Shawn Cunningham and Judd Carper, Transducers '99, Sendai, Japan, 1999, pp. 522–525.

Redacted version of Stipulated Order Of Dismissal With Prejudice, *Sonion MEMS A/S* v. *Knowles Electronics LLC,* Civil Action No. 05–566–GMS, U.S. District Court for the District of Delaware; non–redacted version filed under seal on Mar. 14, 2006 and signed by Judge Sleet on Mar. 31, 2006; redacted version entered into court docket on Apr. 7, 2006.

Complaint, *Sonion MEMS A/S* v. *Knowles Electronics LLC,* Civil Action No. 05–566–GMS, U.S. District Court for the District of Delaware, dated Aug. 4, 2005.

Design of a Silicon Microphone with Differential Read–Out of a Sealed Double Parallel–Plate Capacitor, Jesper Bay, Ole Hansen, and Siebe Bouwstra, 8$^{th}$ International Conference on Solid–State Sensors and Actuators, and Eurosensors IX, Stockholm, Sweden, Jun. 25–29, 1995, pp. 700–703.

"Anti–Stiction Hydrophobic Surfaces for Microsystems", by P. Vourmard, et al., CSEM scientific and technical report 1998.

"The property of plasma polymerized fluorocarbon film in relation to $CH_4/C_4F_8$ ratio and substrate temperature" by Y. Matsumoto, et al., Proc. of Transducers '99, Jun. 7–10, 1999, Sendia, Japan, 34–37.

"Self–Assembled Monolayer Films as Durable Anti–Stiction Coatings for Polysilicon Microstructures" by M.R. Houston, et al. Solid–State Sensor and Actuator Workshop Hilton head, South Carolina, Jun. 206, 1996.

"Elimination of Post–Release Adhesion in Microstructures Using Conformal Fluorocarbon Coatings" by P.F. Man, et al. Journal of Microelectromechanical Systems, vol. 6, No. 1, Mar. 1997.

"Anti–Stiction Methods for Micromechanical Devices: A Statistical Comparison of Performance" by S. Tatic–Lucid, et al. Proc. of Transducers '99, Jun. 7–10, 1999, Sendai, Japan 522–525.

"A New Class of Surface Modification of Striction Reduction", C.–H. Oh et al. Proc. of Transducers '99, Jun. 7–10, 1999, Sendai, Japan 30–33.

"Self–assembled Monolayers as Anti–Stiction Coatings for Surface Microstructures", by R. Maboudin, Proc. of Transducers, '99, Jun. 7–10, 1999, Sendai, Japan 22–25.

"Anti–Stiction Silanization Coating of Silicon Micro–Structures by a Vapor Phase Deposition Process", by J. Sakate, et al. Proc. of Transducers '99, Jun. 7–10, 1999, Sendai, Japan 26–29.

"Fabrication of a Silicon Micromachined Capacitive Microphone Using A Dry–Etch Process" Sensor and Actuators A 53 (1996) 237–242 by Ning et al.

METHOD OF PROVIDING A HYDROPHOBIC LAYER AND CONDENSER MICROPHONE HAVING SUCH A LAYER

Matter enclosed in heavy brackets [ ] appears in the original patent but forms no part of this reissue specification; matter printed in italics indicates the additions made by reissue.

TECHNICAL FIELD

The present invention relates to a method of providing a hydrophobic layer to inner surfaces of a microstructure, in particular to inner surfaces of a condenser microphone, in order to avoid or prevent stiction between said inner surfaces.

BACKGROUND OF THE INVENTION

During the manufacturing as well as the operation of micro electromechanical system (MEMS) devices, it is well known that failure due to adhesion between surfaces, e.g. between a moving surface and a substantially stationary surface, of the device may occur. This phenomenon is referred to as stiction. Stiction occurs with a larger probability in microstructures, typically having dimensions in the order of magnitude of 1–3 μm because the surface-to-volume ratio increases and surface forces, which are responsible for stiction, are correspondingly higher. Stiction may occur during or after the manufacturing process (i.e. during operation), after releasing of the microstructure where the surface tension of the rinse liquid is sufficiently strong to pull the suspending microstructures in contact with the substrate or another compliant or stiff counter surface, leading to permanent adhesion. This kind of stiction is referred to as 'after-release stiction'. Alternatively or additionally, stiction may occur after a successful release, e.g. when a microstructure is exposed to an environment of increased humidity or changing temperature. If the microstructure is first exposed to a humid environment, water vapour can condense and form a water film/droplets on the device surfaces. When the distance between the two surfaces decreases during device operation and the water film/droplets of one surface touch the counter surface, the two surfaces will stick together. This phenomenon may occur during the normal device operation and is therefore referred to as 'in-use stiction'. In-use stiction is in particular a problem in microstructures in which opposite surfaces, e.g. a diaphragm and a back-plate, form capacitors in combination with each other. This is, e.g., the case in condenser microphones and condenser pressure sensors.

The present invention is concerned with preventing stiction in microstructures, in particular in MEMS condenser microphones.

It is further known that the application of a hydrophobic layer to the surfaces in question can solve, or a least relieve, the problem. This has, e.g., been described in U.S. Pat. No. 5,822,170, in "Anti-Stiction Hydrophobic Surfaces for Microsystems" by P. Voumard, et al., CSEM scientific and technical report 1998, Neuchâtel, Switzerland, 26, in "The property of plasma polymerized fluorocarbon film in relation to $CH_4/C_4F_8$ ratio and substrate temperature" by Y. Matsumoto, et al., Proc. of Transducers '99, Jun. 7–10, 1999, Sendai, Japan, 34–37, in "Self-Assembled Monolayer Films as Durable Anti-Stiction Coatings for Polysilicon Microstructures" By M. R. Houston, et al. Solid-State Sensor and Actuator Workshop Hilton Head, South Carolina, Jun. 2–6, 1996, 42–47, in "Elimination of Post-Release Adhesion in Microstructures Using Conformal Fluorocarbon Coatings" by P. F. Man, et al., Journal of Microelectromechanical Systems, Vol. 6, No. 1, March 1997, in "Anti-Stiction Methods for Micromechanical Devices: A Statistical Comparison of Performance" by S. Tatic-Lucid, et al., Proc. of Transducers '99, Jun. 7–10, 1999, Sendai, Japan, 522–525, in "A New Class of Surface Modification for Stiction Reduction", by C.-H. Oh, et al., Proc. of Transducers '99, Jun. 7–10, 1999, Sendai, Japan, 30–33, in "Self-Assembled Monolayers as Anti-Stiction Coatings for Surface Microstructures", by R. Maboudin, Proc. of Transducers '99, Jun. 7–10, 1999, Sendai, Japan, 22–25, and in "Anti-Stiction Silanization Coating to Silicon Micro-Structures by a Vapor Phase Deposition Process", by J. Sakata, et al., Proc. of Transducers '99, Jun. 7–10, 1999, Sendai, Japan, 26–29.

The references above describe depositions of a hydrophobic layer, e.g. a self-assembled monolayer (SAM) onto surfaces of the microstructure, the microstructure preferably being made from a silicon material, such as a Si-wafer or poly-silicon layers. The deposition is primarily performed by successively positioning the microstructure in various liquids. However, in "Anti-Stiction Silanization Coating to Silicon Micro-Structures by a Vapor Phase Deposition Process", by J. Sakata, et al., Proc. of Transducers '99, Jun. 7–10, 1999, Sendai, Japan, 26–29, The deposition is performed by a vapour phase deposition process (dry process), in which the microstructure is positioned in a container containing a gas or a vapour. The advantage of this process is that it is possible to obtain a homogeneous coating, even inside a complicated microstructure, and even inside a space with narrow gaps. However, it has turned out that using a vapour phase deposition process results in a hydrophobic layer having a surface which is less structured than the surface of a hydrophobic layer which has been deposited using a liquid phase deposition process. This is due to the fact that the molecules forming the monolayer form cross bindings in addition to forming bonds to the surface. With a certain probability, this reaction already happens in the gas-phase. Therefore, molecule clusters are deposited that cannot chemically bind to the surface anymore or that can only partly chemically bind to the surface. This results in a less structured layer and therefore rough surface, which makes it possible for water droplets to attach to the surface, even though the material surface otherwise would be highly hydrophobic. Thus, the hydrophobic property of the surfaces is partly or possibly totally reduced. Furthermore, the process described in this reference requires special equipment. In addition, the sacrificial layer has to be removed and the structure has to be released before the hydrophobic layer can be applied. The release process is a critical process with a certain yield, which will reduce the total yield of the manufacturing process and increase the manufacturing costs. The gas phase deposition also needs pumping steps, which bear the risk for stiction due to fast pressure transients. Therefore, the coating process performed from a liquid material is preferred.

It is, thus, desirable to be able to provide a method for providing a hydrophobic layer to the inner parts of a microstructure in such a way that the hydrophobic property of the layer is maintained.

SUMMARY OF THE INVENTION

It is an object of the present invention to provide a method of providing a microstructure with a hydrophobic layer in such a way that a very structured layer may be applied to microstructures, even to microstructures having internal spaces with narrow gaps.

It is a further object of the present invention to provide a method of providing a microstructure with a hydrophobic layer, which may be introduced as a natural part of the manufacturing process for the microstructure.

It is an even further object of the present invention to provide a method of providing a microstructure with a hydrophobic layer, which minimises the number of production steps of the manufacture of the microstructure.

It is an even further object of the present invention to provide a condenser microphone in which the stiction phenomenon is avoided.

According to the present invention the above and other objects are fulfilled by a method of providing at least part of a diaphragm and at least a part of a back-plate of a condenser microphone with a hydrophobic layer so as to avoid stiction between said diaphragm and said back-plate, said method comprising the steps of providing a condenser microphone comprising a diaphragm and a back-plate, wherein an inner surface of said diaphragm forms a capacitor in combination with an inner surface of said back-plate, and providing the hydrophobic layer onto the inner surfaces of the diaphragm and the back-plate through a number of openings, said openings being in the back-plate, in the diaphragm and/or between the diaphragm and the back-plate.

The condenser microphone may be a microphone for recording ordinary sound waves, e.g. propagating in atmospheric air. However, it may additionally or alternatively be a microphone which is adapted to perform measurements in a hostile environment, e.g. in a humid, extremely hot, or extremely cold environment. In this case the condenser microphone needs to be able to function under such extreme conditions. It is especially important that water vapour (or other vapours which the microphone may be in contact with) can not condense easily on the inner parts of the microphone, since this would lead to water droplets and a temporary stiction between the diaphragm and the back-plate, which in turn causes the functionality of the microphone to decreases. If the water in the air gap dries, the back-plate and the diaphragm have to separate again. According to the invention such condensation is prevented or at least reduced by providing the diaphragm and at least part of the back-plate with a hydrophobic layer.

The microphone is preferably a MEMS microphone, i.e. at least the diaphragm and/or the back-plate are manufactured using semiconductor technology.

An inner surface of the diaphragm and an inner surface of the back-plate of the microphone form a capacitor. Since the diaphragm is movable in relation to the back-plate, which is substantially stationary, the capacitance of said capacitor depends on the immediate distance between the diaphragm and the back-plate.

The hydrophobic layer is provided onto the inner surfaces of the diaphragm and the back-plate, respectively, through a number of openings. The openings are positioned in the back-plate, in the diaphragm and/or between the diaphragm and the back-plate. Thus, the coating material may be applied to inner surfaces of the microphone in a homogeneous and structured manner, even if the microphone comprises small cavities to which it would otherwise be difficult to gain access. Furthermore, this coating process may advantageously be applied in continuation of the normal manufacturing procedure. Thus, it is neither necessary to dry the microphone after the normal manufacturing steps before the coating process, nor to use special equipment for the process. This renders the coating process of the present invention cost effective and easy to perform, which in turn makes it very attractive for commercial purposes.

For the gas-phase deposition but even more for the liquid deposition the dynamics of the deposition processes have to be taken into account. It is very difficult to deposit the coating material into the air gap of a MEMS microphone with typical lateral dimensions (back-plate or diaphragm radius and side length, respectively) of 0.5 mm to 2 mm and typical air gap heights of only 0.3 μm to 10 μm. These high aspect ratios reduce the deposition rate and make the process very time consuming and inefficient. In order to get a direct access to the middle part of the air gap, the deposition has to be performed through a number of openings in the back-plate, in the diaphragm, and/or gaps at the periphery of the back-plate and the diaphragm. This makes the process faster and thus more cost effective.

At least the inner surfaces of the diaphragm and the back-plate may be made from a hydrophilic material. If the inner diaphragm surface and/or the inner surface of the back-plate are hydrophilic, this property would cause stiction if water would dry out the air gap volume. The term 'hydrophilic material' could be interpreted as a material having a surface which shows with water a contact angle below 90°. Thus, water droplets may easily form on a hydrophilic surface. Materials that form hydrophilic surfaces may, e.g., be silicon, poly-silicon, $SiO_2$, $Si_xN_y$ (such as $Si_3N_4$), and/or any other suitable material.

The inner surface of the diaphragm and/or the inner surface of the back-plate may, however, process hydrophobic properties which need to be improved.

In one embodiment of the present invention the smallest dimension of each of the openings does not exceed 10 μm, such as not exceeding 7 μm, such as not exceeding 5 μm, such as not exceeding 3 μm, such as not exceeding 1 μm, such as not exceeding 0.7 μm, such as not exceeding 0.5 μm. The smallest dimension of each of the openings may, thus, be approximately 3 μm, such as approximately 2 μm, approximately 4 μm, approximately 2.5 μm, approximately 3.5 μm, approximately 2.7 μm, or approximately 3.2 μm. The smallest dimension of each of the openings may, alternatively, be larger. The smallest dimension of each of the openings may also be even smaller.

One or more of the openings may be shaped as substantially circular hole(s), in which case the smallest dimension of each opening may refer to the diameter of such a hole. Alternatively or additionally, one or more of the openings may be shaped as elongated groove(s), in which case the smallest dimension of each opening may refer to the transversal size of such a groove. Alternatively or additionally, one or more of the openings may be shaped as a square, a rectangle, or any other polygonal shape, and/or one or more of the openings may be shaped in any other suitable way.

The static distance between the diaphragm and the back-plate is preferably smaller than 10 μm, such as smaller than 7 μm, such as smaller than 5 μm, such as smaller than 3 μm, such as smaller than 1 μm, such as smaller than 0.7 μm, such as smaller than 0.5 μm, such smaller than 0.3 μm, such as approximately 0.2 μm. The static distance between the diaphragm and the back-plate may, thus, be approximately 1 μm, such as approximately 0.5 μm, approximately 0.7 μm, approximately 0.9 μm, approximately 1.2 μm, or approximately 1.5 μm.

The term 'static distance' should be interpreted as the distance between the diaphragm and the back-plate when the diaphragm is in a static equilibrium. In this case inner surfaces of the diaphragm and the back-plate will normally be approximately parallel to each other, and the 'static distance' should be understood as the distance between these inner surfaces along a direction being normal to the two parallel inner surfaces.

The step of providing the hydrophobic layer may be performed by chemical binding of the hydrophobic layer to poly-silicon, silicon oxide, silicon nitride and/or silicon-rich silicon nitride surfaces, and forming hydrophobic chains from said hydrophobic layer, said hydrophobic chains pointing away from the surface to which the binding is formed.

In this case at least the diaphragm and/or the back-plate may be manufactured from one or more of the above mentioned materials.

The step of providing the hydrophobic layer may comprise the steps of forming a molecule monolayer, and cross linking between molecules and multi binding to surfaces In this embodiment the provided hydrophobic layer is very durable and stable.

The hydrophobic layer base material may comprise an alkylsilane, such as:

$C_nH_{2n+1}C_2H_4SiX_3$; X=$OCH_3$ or $OCH_2CH_3$ or Cl; n=1, 2, 3, . . .

$C_nH_{2n+1}C_2H_4SiX_2Y$; X=$OCH_3$ or $OCH_2CH_3$ or Cl; Y=$C_mH_{2m+1}$; n=1, 2, 3, . . . ; m=1, 2, 3, . . .

or $C_nH_{2n+1}C_2H_4SiXY_2$; X=$OCH_3$ or $OCH_2CH_3$ or Cl; Y=$C_mH_{2m+1}$; n=1, 2, 3, . . . ; m=1, 2, 3, . . .

Alternatively, the hydrophobic layer base material may comprises a perhaloalkylsilane, e.g. a perfluoroalkylsilane, such as $C_nF_{2n+1}C_2H_4SiX_3$; X=$OCH_3$ or $OCH_2CH_3$ or Cl; n=1, 2, 3, . . .

$C_nF_{2n+1}C_2H_4SiX_2Y$; X=$OCH_3$ or $OCH_2CH_3$ or Cl; Y=$C_mH_{2m+1}$; n=1, 2, 3, . . . ; m=1, 2, 3, . . .

or $C_nF_{2n+1}C_2H_4SiXY_2$; X=$OCH_3$ or $OCH_2CH_3$ or Cl; Y=$C_mH_{2m+1}$; n=1, 2, 3, . . . ; m=1, 2, 3, . . .

The method may further comprise the step of positioning at least part of the diaphragm and at least part of the back-plate in a liquid comprising a liquid phase of the hydrophobic layer material to be provided on the inner surfaces. In this embodiment the hydrophobic layer is provided using a liquid phase deposition method. As mentioned above, this usually results in a very structured monolayer being deposited.

Alternatively, the method may further comprise the step of positioning at least part of the diaphragm and at least part of the back-plate in a container comprising a gaseous phase of the hydrophobic layer base material to be provided on the inner surfaces. The container may alternatively or additionally comprise a vapour of the hydrophobic layer base material. In this embodiment the hydrophobic layer is provided using a vapour deposition method.

Preferably, the hydrophobic layer being provided has a contact angle for water being between 90° and 130°, such as between 100° and 110°.

The hydrophobic layer being provided is preferably stable at temperatures between −40° C. and 130° C., such as temperatures between −30° C. and 110° C. It is most preferably stable at temperatures up to at least 400° C. for at least 5 minutes.

According to another aspect the present invention provides a condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surfaces being provided with a hydrophobic layer, and wherein the static distance between said diaphragm and said back-plate is smaller than 10 μm.

The condenser microphone according to the invention is thus a microstructure in which inner surfaces of a narrow space or cavity (i.e. the space or cavity defined by the inner surfaces of the back-plate and the diaphragm, respectively) have been provided with a hydrophobic layer. The hydrophobic layer has most preferably been provided via the number of openings, i.e. according to the method described above.

At least the inner surfaces of the diaphragm and the back-plate may be made from a hydrophilic material as described above. However, the inner surface of the diaphragm and/or the inner surface of the back-plate may, to some extend, posses hydrophobic properties which it is desirable to improve.

Preferably, the smallest dimension of each of the openings does not exceed 10 μm, such as not exceeding 5 μm, such as not exceeding 1 μm, such as not exceeding 0.5 μm. The smallest dimension of each of the openings may, thus, be approximately 3 μm.

The hydrophobic layer base material may comprise an alkylsilane, such as $C_nH_{2n+1}C_2H_4SiX_3$; X=$OCH_3$ or $OCH_2CH_3$ or Cl; n=1, 2, 3, . . .

$C_nH_{2n+1}C_2H_4SiX_2Y$; X=$OCH_3$ or $OCH_2CH_3$ or Cl; Y=$C_mH_{2m+1}$; n=1, 2, 3, . . . ; m=1, 2, 3, . . .

or $C_nH_{2n+1}C_2H_4SiXY_2$; X=$OCH_3$ or $OCH_2CH_3$ or Cl; Y=$C_mH_{2m+1}$; n=1, 2, 3, . . . ; m=1, 2, 3, . . .

Alternatively, the hydrophobic layer base material may comprise a perhaloalkylsilane, e.g. a perfluoroalkylsilane, such as $C_nF_{2n+1}C_2H_4SiX_3$; X=$OCH_3$ or $OCH_2CH_3$ or Cl; n=1, 2, 3, . . .

$C_nF_{2n+1}C_2H_4SiX_2Y$; X=$OCH_3$ or $OCH_2CH_3$ or Cl; Y=$C_mH_{2m+1}$; n=1, 2, 3, . . . ; m=1, 2, 3, . . .

or $C_nF_{2n+1}C_2H_4SiXY_2$; X=$OCH_3$ or $OCH_2CH_3$ or Cl; Y=$C_mH_{2m+1}$; n=1, 2, 3, . . .

The static distance between the diaphragm and the back-plate may be smaller than 5 μm, such as smaller than 1 μm, such as smaller than 0.5 μm, such as smaller than 0.3 μm. The static distance between the diaphragm and the back-plate may, thus, be approximately 1 μm, such as approximately 0.9 μm.

The hydrophobic layer preferably has a contact angle for water being between 90° and 130°, such as between 100° and 110°, and it is preferably stable at temperatures between −40° C. and 130° C., such as temperature between −30° C. and 110° C. Most preferably, the hydrophobic layer is stable at temperatures up to at least 400° C. for at least 5 minutes.

DETAILED DESCRIPTION OF THE DRAWINGS

Figure 1:
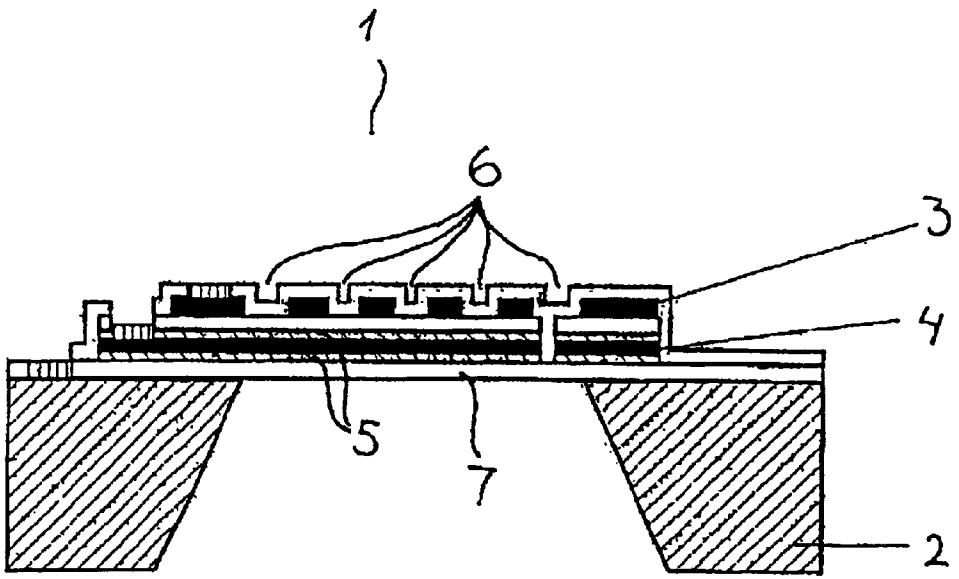
FIG. 1 is a schematic drawing of a condenser microphone cross section during a manufacturing process, before sacrificial layer $SiO_2$ etching.
Figure 2:
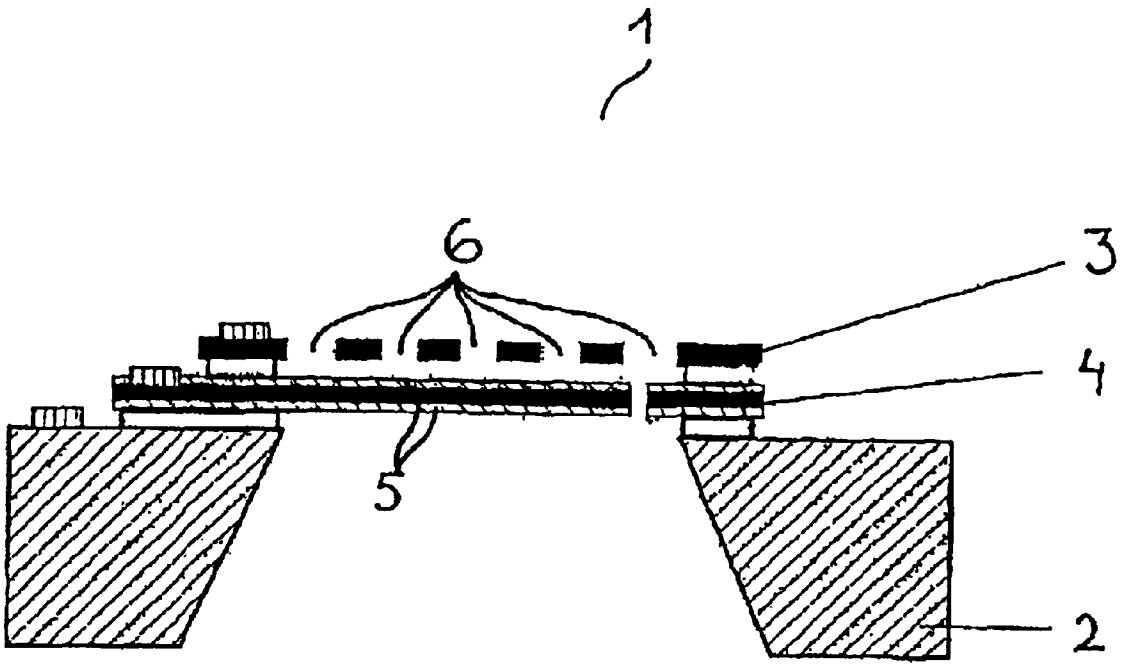
FIG. 2 shows the condenser microphone cross section of FIG. 1, but after sacrificial layer $SiO_2$ etching.
Figure 3:
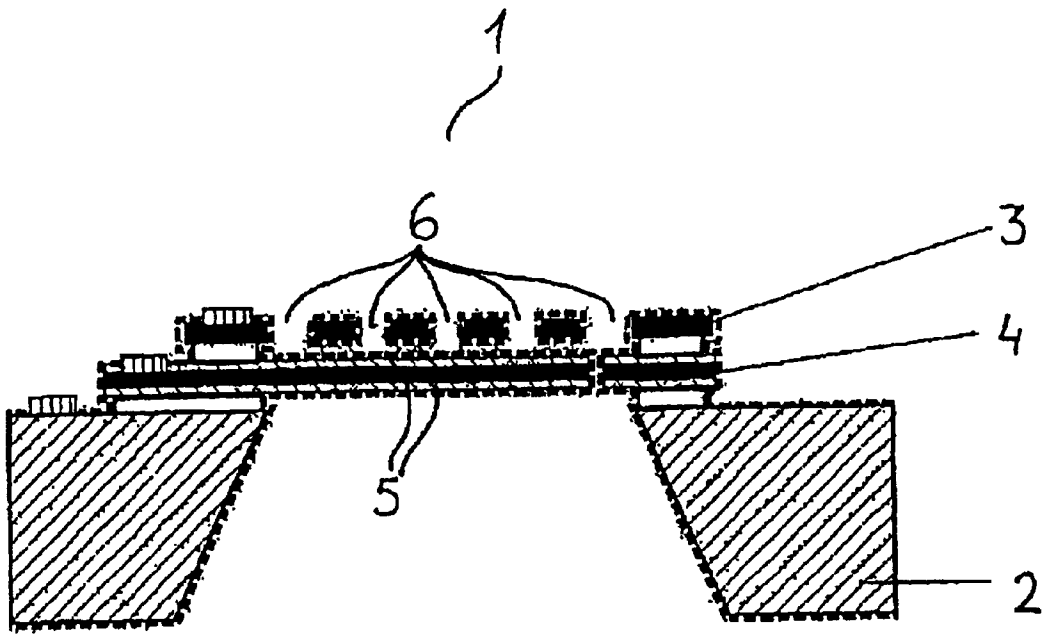
FIG. 3 shows the condenser microphone cross section of FIGS. 1 and 2, after a hydrophobic coating has been applied.

FIGS. 1–3 illustrate the last part of a manufacturing process for a condenser microphone 1, including applying a hydrophobic coating to the microphone 1, the process being performed in accordance with the present invention.

The microphone 1 comprises a supporting structure 2, a back-plate 3, and a diaphragm 4. The supporting structure 2 is preferable made from a silicon substrate, the back-plate 3 is preferably made from poly-silicon, and the diaphragm 4 is preferably made from a poly-silicon/silicon-rich silicon nitride (layers 5) sandwich. The back-plate 3 is provided with a number of openings 6 through which the hydrophobic coating material may pass (see below). In the Figures there is shown five openings 6 for illustrative purposes. However, in reality the number of openings 6 occurring in a back-plate of $1\times1$ $mm^2$ will typically be in the order of 30,000. The diaphragm 4 is movable by a sound pressure and the back-plate 3 is substantially stationary, and in combination the diaphragm 4 and the back-plate 3 form a capacitor, the capacitance of which depends on the immediate distance between the two.

During the manufacturing of the microphone 1, a sacrificial layer 7 is applied to the microphone 1 in order to define the air gap height. The sacrificial layer 7 is preferably made from $SiO_2$, SiON or SiGeON. When the process steps which are normally applied have been carried out, the sacrificial layer 7 needs to be at least partially removed in order to allow the diaphragm 4 to move in relation to the back-plate 3. This sacrificial layer 7 may be removed by an etching process using HF (hydrofluoric acid) followed by a water rinse. FIG. 1 shows the microphone 1 before the sacrificial etching process is applied, and FIG. 2 shows the microphone 1 after the sacrificial etching process is applied. It is clear that the sacrificial layer 7 which is present in FIG. 1 has been removed from the microphone 1 of FIG. 2.

The microphone 1 is then cleaned by means of a so-called 'piranha clean'. The microphone 1 is dipped into a container containing a liquid of three parts $H_2O_2$ and seven parts $H_2SO_4$. Subsequently, the microphone 1 is water rinsed.

After the water rinse the microphone 1 is transferred into a container containing isopropanol (IPA, 2-propanol) in order to perform an IPA rinse. This step is repeated twice, i.e. the microphone 1 is, in turn, transferred into two other containers containing a fresh IPA solution. Subsequently, the microphone 1 is transferred into a container containing heptane in order to perform a heptane rinse. This step is also repeated twice as described above.

Next, the actual coating step of is performed by means of silane deposition. This is done by transferring the microphone to a container containing heptane with perhaloalkylsilanes, e.g. perfluoroalkylsilanes, or alkylsilanes, i.e. the actual hydrophobic coating material. Due to the openings 6 provided in the back-plate 3, the coating material may enter the inner parts of the microphone 1, i.e. the parts defined by the opposite surfaces of the back-plate 3 and the diaphragm 4, respectively. The coating material may, thus, be deposited to the surfaces of these inner parts, such as the inner surfaces of the back-plate 3 and the diaphragm 4, respectively. Furthermore, since the deposition is performed using a liquid phase deposition method, the resultant hydrophobic layer is a structured monolayer. Thus, the hydrophobic properties of the material are maintained at a high level.

Subsequently, first the heptane rinse steps and then the IPA rinse steps described above are repeated. Then the microphone 1 is water rinsed, dried, and post-baked in order to stabilise the coating.

The IPA rinse steps, the heptane rinse steps, the coating process and/or the water rinse steps described above may, alternatively, be performed by continuously renewing the solution in the container, thus avoiding to transfer the microphone 1 from one container to another during the rinse step in question. This reduces the exposure to air of the microphone 1 and, thus, the probability of drying before the coating process is finished. This makes the coating process easier to handle, i.e. more attractive for commercial purposes.

FIG. 3 shows the microphone 1 after the coating process described above has been performed. The resulting coating is shown as a dotted line.

The coating process as described above may advantageously be performed in continuation of the normal manufacturing process.

Thus, a method of providing at least part of a diaphragm and at least a part of a back-plate of a condenser microphone with a hydrophobic layer has been provided which is easy to perform, and, thus, attractive for commercial purposes. Furthermore, a condenser microphone has been provided in which in-use stiction between the diaphragm and the back-plate is avoided, or at least prevented to a great extend.

What is claimed is:

1. A condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surface of the back-plate and said inner surface of the diaphragm being provided with a hydrophobic layer, and wherein the static distance between said diaphragm and said back-plate is smaller than 10 μm.

2. A condenser microphone according to claim 1, wherein at least the inner surfaces of the diaphragm and the back-plate are made from a hydrophilic material.

3. A condenser microphone according to claim 1, wherein the smallest dimension of each of the openings does not exceed 10 μm.

4. A condenser microphone according to claim 3, wherein the smallest dimension of each of the openings does not exceed 5 μm.

5. A condenser microphone according to claim 4, wherein the smallest dimension of each of the openings does not exceed 1 μm.

6. A condenser microphone according to claim 5, wherein the smallest dimension of each of the openings does not exceed 0.5 μm.

7. A condenser microphone according to claim 4, wherein the smallest dimension of each of the openings is approximately 3 μm.

8. A condenser microphone according to claim 1, wherein the hydrophobic layer base material comprises an alkylsilane.

9. A condenser microphone according to claim 1, wherein the hydrophobic layer base material comprises a perhaloalkylsilane.

10. A condenser microphone according to claim 1, wherein the static distance between the diaphragm and the back-plate is smaller than 5 μm.

11. A condenser microphone according to claim 10, wherein the static distance between the diaphragm and the back-plate is smaller than 1 μm.

12. A condenser microphone according to claim 11, wherein the static distance between the diaphragm and the back-plate is smaller than 0.5 μm.

13. A condenser microphone according to claim 12, wherein the static distance between the diaphragm and the back-plate is smaller than 0.3 μm.

14. A condenser microphone according to claim 11, wherein the static distance between the diaphragm and the back-plate is approximately 0.9 μm.

15. A condenser microphone according to claim 1, wherein the hydrophobic layer has a contact angle for water being between 90° and 130°.

16. A condenser microphone according to claim 15, wherein the hydrophobic layer has a contact angle for water being between 100° and 110°.

17. A condenser microphone according to claim 1, wherein the hydrophobic layer is stable at temperatures between −40° C. and 130° C.

18. A condenser microphone according to claim 17, wherein the hydrophobic layer is stable at temperatures between −30° C. and 110° C.

19. A condenser microphone according to claim 1, wherein the hydrophobic layer is stable at temperatures up to at least 400° C. for at least 5 minutes.

20. A condenser microphone comprising a diaphragm and a back-plate, wherein an inner surface of said diaphragm forms a capacitor in combination with an inner surface of said back-plate, said back-plate and/or said diaphragm is/are provided with a number of openings, and said inner surface of the back-plate and/or said inner surface of the diaphragm being provided with a hydrophobic layer having a contact angle for water being larger than 90°, and wherein the static distance between said diaphragm and said back-plate is smaller than 10 μm.

21. A condenser microphone comprising:

a diaphragm;

a back-plate, wherein an inner surface of said diaphragm forms a capacitor in combination with an inner surface of said back-plate, said back-plate and/or said diaphragm being provided with a number of openings, wherein the static distance between said diaphragm and said back-plate is smaller than 10 μm; and a hydrophobic layer, provided on said inner surface of the back-plate and/or on said inner surface of the diaphragm.

*22. A microelectromechanical microphone, comprising:*

*a diaphragm and a back-plate with an air gap therebetween, the diaphragm and a back-plate including respective inner surfaces forming a capacitor, the respective inner surfaces being made of a hydrophobic or hydrophilic materials;*

*a number of openings leading to the air gap; and*

*a hydrophobic molecular monolayer coating on the inner surface of the diaphragm or the back-plate, wherein molecules of the molecular monolayer are cross-linked and multi-bounded to the inner surface of the diaphragm or the back-plate.*

*23. The microelectromechanical microphone according to claim 22, wherein the multi-bounded molecular monolayer forms hydrophobic chains pointing away from the inner surface of the diaphragm or the back-plate.*

*24. The microelectromechanical microphone according to claim 23, wherein the hydrophobic molecular monolayer has a contact angle for water greater than 90°.*

*25. The microelectromechanical microphone according to claim 24, wherein the hydrophobic molecular monolayer includes a perfluoralkylsilane.*

*26. The microelectromechanical microphone according to claim 24, wherein the hydrophobic molecular monolayer includes an alkylsilane.*

*27. The microelectromechanical microphone according to claim 24, wherein the hydrophobic molecular monolayer includes a perhaloalkylsilane.*

*28. The microelectromechanical microphone according to claim 23, wherein the hydrophobic molecular monolayer has a contact angle for water greater than about 100°.*

*29. The microelectromechanical microphone according to claim 23, wherein the hydrophobic molecule monolayer is stable at temperatures up to at least 400° C. for at least 5 minutes.*

*30. The microelectromechanical microphone according to claim 22, wherein the molecular monolayer comprises a structured molecule monolayer.*

*31. The microelectromechanical microphone according to claim 22, wherein the diaphragm or the back-plate comprises respective materials including at least one of silicon, poly-silicon, silicon-oxide, silicon nitride, or silicon-rich silicon nitride.*

*32. The microelectromechanical microphone according to claim 22, wherein the hydrophobic molecular monolayer includes a perfluoralkylsilane, an alkylsilane or a perhaloalkylsilane.*

*33. The microelectromechanical microphone according to claim 22, wherein the hydrophobic molecular monolayer has a contact angle for water between 90° and 130°.*

*34. The microelectromechanical microphone according to claim 22, wherein the hydrophobic molecular monolayer is stable at temperatures up to at least 400° C. for at least 5 minutes.*

*35. The microelectromechanical microphone according to claim 22, wherein the number of openings is in the back-plate, the openings receiving the hydrophobic molecular monolayer during the coating process.*

*36. The microelectromechanical microphone according to claim 35, wherein the hydrophobic molecular monolayer is stable at temperatures up to at least 400° C. for at least 5 minutes and has a contact angle for water between 90° and 130°.*

*37. The microelectromechanical microphone according to claim 22, wherein the number of openings is in the diaphragm, the openings receiving the hydrophobic molecular monolayer during the coating process.*

*38. The microelectromechanical microphone according to claim 22, wherein the number of openings is in the diaphragm and in the back-plate, the openings receiving the hydrophobic molecular monolayer during the coating process.*

*39. The microelectromechanical microphone according to claim 22, wherein the hydrophobic molecular monolayer has a contact angle for water between 100° and 110°.*

*40. The microelectromechanical microphone according to claim 22, wherein the air gap has a static distance not exceeding 10 μm.*

*41. A microelectromechanical microphone, comprising:*

*a diaphragm having an inner surface;*

*a back-plate having an inner surface that, together with the inner surface of the diaphragm, forms a capacitor, wherein the static distance between the back-plate and the diaphragm does not exceed 10 μm; and*

*a hydrophobic layer on the inner surface of the diaphragm and the inner surface of the back-plate, the hydrophobic layer being deposited through a number of openings provided in at least one of (i) the back-plate, (ii) the diaphragm, or (ii) gaps at a periphery of the back-plate and the diaphragm.*

*42. The microelectromechanical microphone according to claim 41, wherein the hydrophobic layer is a hydrophobic*

*molecular monolayer, wherein molecules of the molecule monolayer are cross-linked and multi-bounded to the respective inner surfaces of the diaphragm and the back-plate.*

*43. The microelectromechanical microphone according to claim 37, wherein the molecular monolayer comprises a structured molecular monolayer.*

*44. The microelectromechanical microphone according to claim 37, wherein the hydrophobic molecular monolayer has a contact angle for water greater than 90°.*

*45. The microelectromechanical microphone according to claim 39, wherein the hydrophobic molecule monolayer is stable at temperatures up to at least 400° C. for at least 5 minutes.*

*46. The microelectromechanical microphone according to claim 41, wherein the hydrophobic coating has a contact angle for water greater than 90°.*

*47. The microelectromechanical microphone according to claim 41, wherein the hydrophobic layer is stable at temperatures up to at least 400° C. for at least 5 minutes.*

*48. The microelectromechanical microphone according to claim 41, wherein the hydrophobic layer is deposited by gaseous-phase deposition onto the inner surfaces of the diaphragm and the back-plate through the number of openings.*

*49. The microelectromechanical microphone according to claim 41, wherein the hydrophobic layer is deposited by liquid-phase deposition onto the inner surfaces of the diaphragm and the back-plate through the number of openings.*

*50. The microelectromechanical microphone according to claim 41, wherein the hydrophobic layer is stable at temperatures between at least −30° C. and at least 110° C.*

*51. The microelectromechanical microphone according to claim 41, wherein the hydrophobic layer has a contact angle for water greater than about 100°.*

*52. A microelectromechanical microphone, comprising:*

*a diaphragm and a back-plate defining an air gap between respective inner surfaces thereof, the respective inner surfaces forming a capacitor, the static distance between the diaphragm and the back-plate not exceeding 10 μm;*

*a number of openings leading to the air gap; and*

*a hydrophobic layer deposited through the number of openings into the air gap to form a structured monolayer on at least one of the inner surface of the diaphragm or the inner surface of the back-plate.*

*53. The microelectromechanical microphone of claim 52, wherein the diaphragm includes the number of openings.*

*54. The microelectromechanical microphone of claim 52, wherein the back-plate includes the number of openings.*

*55. The microelectromechanical microphone of claim 52, wherein the back-plate and the diaphragm includes the number of openings.*

*56. The microelectromechanical microphone according to claim 55, wherein the hydrophobic layer is deposited by gaseous-phase or liquid-phase deposition onto the inner surfaces of the diaphragm and the back-plate through the number of openings.*

*57. The microelectromechanical microphone of claim 52, wherein the number of openings correspond to gaps at the periphery of the back-plate and the diaphragm.*

*58. The microelectromechanical microphone of claim 52, wherein the number of openings are positioned between the diaphragm and the back-plate.*

*59. The microelectromechanical microphone according to claim 58, wherein the hydrophobic layer has a contact angle for water greater than about 100°.*

*60. The microelectromechanical microphone of claim 52, wherein the hydrophobic layer is a hydrophobic molecular monolayer, wherein molecules of the molecular monolayer are cross-linked and multi-bounded to the respective inner surfaces of the diaphragm and the back-plate.*

*61. The microelectromechanical microphone according to claim 60, wherein the molecule monolayer comprises a structured molecule monolayer.*

*62. The microelectromechanical microphone according to claim 61, wherein the hydrophobic molecular monolayer has a contact angle for water greater than 90°.*

*63. The microelectromechanical microphone according to claim 62, wherein the hydrophobic molecular monolayer is stable at temperatures between at least −30° C. and at least 110° C.*

*64. The microelectromechanical microphone according to claim 52, wherein the hydrophobic layer is stable at temperatures up to at least 400° C. for at least 5 minutes.*

*65. The microelectromechanical microphone according to claim 52, wherein the hydrophobic layer is deposited by gaseous-phase deposition onto the inner surfaces of the diaphragm and the back-plate through the number of openings.*

*66. The microelectromechanical microphone according to claim 52, wherein the hydrophobic layer is deposited by liquid-phase deposition onto the inner surfaces of the diaphragm and the back-plate through the number of openings.*

*67. The microelectromechanical microphone according to claim 52, wherein the hydrophobic layer is stable at temperatures between at least −30° C. and at least 110° C.*

*68. A condenser microphone comprising a diaphragm and a back-plate, wherein an inner surface of said diaphragm forms a capacitor in combination with an inner surface of said back-plate, a number of openings being provided in at least one of (i) said back-plate, (ii) said diaphragm, or (ii) gaps at a periphery of said back-plate and said diaphragm, and said inner surface of the back-plate and/or said inner surface of the diaphragm being provided with a hydrophobic layer having a contact angle for water being larger than 90°, and wherein the static distance between said diaphragm and said back-plate is smaller than 10 μm.*

*69. The condenser microphone according to claim 1, wherein said inner surface of the back-plate and said inner surface of the diaphragm is provided with said hydrophobic layer by depositing said hydrophobic layer through the number of openings.*

*70. The condenser microphone according to claim 1, wherein said hydrophobic layer is a hydrophobic molecular monolayer, and wherein molecules of said molecular monolayer are cross-linked and multi-bounded to the inner surface of at least one of said diaphragm or said back-plate.*

*71. The condenser microphone according to claim 70, wherein the multi-bounded molecular monolayer forms hydrophobic chains pointing away from the inner surface of the diaphragm or the back-plate.*

*72. The condenser microphone according to claim 20, wherein said hydrophobic layer is a hydrophobic molecular monolayer, and wherein molecules of said molecular monolayer are cross-linked and multi-bounded to the inner surface of at least one of said diaphragm or said back-plate.*

*73. The condenser microphone according to claim 21, wherein said hydrophobic layer is a hydrophobic molecular monolayer, and wherein molecules of said molecular monolayer are cross-linked and multi-bounded to the inner surface of at least one of said diaphragm or said back-plate.*

* * * * *